3,584,129
PREPARATION OF A COMPOSITION FOR THE RELIEF OF ARTHRITIC PAINS
Joseph R. Kitson, 331 Upper Blvd., Ridgewood, N.J. 07450
No Drawing. Filed Dec. 5, 1968, Ser. No. 781,598
Int. Cl. A61u 27/00
U.S. Cl. 424—234                                   1 Claim

ABSTRACT OF THE DISCLOSURE

A therapeutic composition for application to the skin for amelioration of the pain of arthritic ailments consisting essentially of phenol, glycerine, methyl salicylate, acetic acid, camphor and water in defined proportions to form a clear solution.

BACKGROUND OF THE INVENTION

The present invention relates to novel compositions which are therapeutically useful for the treatment of arthritic joint ailments to develop at least pain relief, and to processes for using them.

It is an object of the present invention to provide compositions useful in the treatment of certain joint diseases of human beings.

According to the present invention, compositions are provided which, when applied in various ways to the skin over the joint of the patient being treated, result in dramatic amelioration of such diseased conditions as osteoarthritis, rheumatoid arthritis, bursitis. In general the present invention is of benefit in treatment of diseases characterized by inflammation of osseous, cartilaginous or fibrous connective tissue.

DEAILED DESCRIPTION OF THE INVENTION

The composition of the present invention consists of a mixture of ingredients none of which when used individually is capable of producing the response obtained by the combination, but in combination are effective.

The compositions of the present invention comprise the following ingredients in approximately the following proportions, by weight:

Phenol _____ 61.63% (55–65).
Glycerine _____ 16.17% (15–19).
Methyl salicylate _____ 10.16% (9–12).
Acetic acid _____ 10.00% (8–12).
Camphor _____ 00.50% (0.25–0.75).
Water _____ 1.54% (1.0–2.0 or q.s.).

The procedure to prepare the composition of the present invention is as follows: Heat the phenol to 190° F., add the methyl salicylate, glycerine, and water to the phenol and stir to form a homogeneous solution; then add the mix to the acetic acid and camphor; while mixing heat the entire mix to 240° F.

The preferred concentration of acetic acid in the above formulation is as indicated, and the preferred concentration of methyl salicylate in the above formulation is also as indicated.

It will be understood that the proportions are subject to some variation as shown in parenthesis. It must be emphasized, however, that the relative proportions are an essential feature of the present invention, and material alteration of the proportions results in loss of the desired therapeutic properties.

It should be noted that the final composition is in the liquid state. By the use of the formulations of the present invention, it is possible to obtain clear, colorless, stable, solutions of phenol crystals in exceedingly small amounts of liquid. Solutions of phenol known prior to the present invention contain considerably larger amounts of solvents, and in addition the previously known solutions had the disadvantage of becoming discolored and crystallizing relatively rapidly. The influence of light and cold in particular tends to decompose the phenol solutions known prior to the present invention, but by means of the present invention it is possible to obtain solutions which are clear and stable for prolonged periods of time even under the influence of light and cold, or changes of temperature.

I am aware of U.S. Pat. 3,046,196 and the composition there defined. My invention is of an improved nature in that as a phenol solution with methyl salicylate and acetic acid it does not give a burning sensation when applied to skin.

The compositions of the present invention possess valuable therapeutic properties which cannot be accounted for or explained by reference to the known properties of the individual components. The formulation has rubefacient, analgesic, penetrant, emollient and antiseptic properties. In addition, it has the totally unexpected ability to bring about amelioration of the arthritic diseased conditions identified.

It is particularly noteworthy that the therapeutic response is obtained not only when the composition is applied to the skin over the diseased area being treated, but also when the composition is applied to the skin over portions of the body other than that of the diseased area. While the mode of action of the composition is not understood, application of the composition apparently produces a systemic reaction. Beneficial effects are elicited at portions of the body distant from the site of application. The compositions of the present invention are therefore unique and provide results which cannot be obtained in any other known way.

The invention is suitable for application to human beings, or to domesticated animals, for example, race horses, having bowed tendons, "jacks," splints, curbs, arthritis and related conditions for which there is no fully satisfactory treatment known. By application of the composition of the present invention these conditions can be overcome successfully and painlessly.

According to the present invention, when a systemic reaction is desired as in the case of treatment for arthritis and related conditions, the composition is applied on the skin of the patient in the following manner: Application may be over the area of the body being treated, or it may be at another more convenient area. The area of the back is often convenient, and has the advantage of presenting a large surface. By applying the composition to a wide-spread area of the skin from an applicator previously impregnated uniformly with the composition any slight tendency of the composition to cause burning of the skin is minimized. Accordingly, the composition is applied, for example, to a wet-strength paper whose size and absorption carries a controlled amount of the composition, and the paper is spread over the skin. The composition is then smoothed by hand into the skin from the paper. The hand is preferably shielded by a non-porous covering impervious to the formula, for example, a polyethylene glove or mitten.

In this respect I also prepare a novel form of package of the composition. Paper is saturated with the composition, laminated between sheets of plastic (polyethylene or polypropylene), sealed on all sides, and is ready for use when the package is opened. Metal foil is also useful for such packaging.

No special type of paper is required for the treatment or package, the only requirements being that the paper be capable of holding the composition by capillary action, that it has sufficient mechanical strength so that it is not torn during the smoothing operation, and that the composition be released from it under the gentle pressure of the rubbing. The paper should preferably be non-woven. Generally grades used for tea bags are useful.

In place of paper, other materials may also be used for the applicator, for example, thin sheets of fabric or cellular plastic materials. The applicator material should, of course, not react chemically with the composition. A preferred embodiment of the present invention is a thin sheet of porous material which is uniformly impregnated with and holds the composition, generally by capillary action, and which is capable of being spread uniformly over the skin area to which application takes place.

Following the proper application of the composition by paper to the back, the skin on which it has been applied becomes somewhat pink, but there is no more discomfort or injury than that resulting from a mild sunburn. When desired, the treatment may be reapplied to the same area within three days.

Another important benefit of the present invention is in the treatment of tension headache. By some unknown mechanism involving a systemic reaction, the present composition results in the amelioration of this condition.

In treating the human body in accordance with the present invention, generally about 2.5 cc. of the composition is used for each treatment. Such an amount of the composition will saturate a piece of paper about 14 inches wide and 18 inches long. The paper is spread over hand until the paper is dry. For all the conditions named above, beneficial effects have been obtained in most cases within a few hours after the first treatment. Sometimes additional applications may be required for the best results. When more than one is used, they are generally carried out about seven days apart.

Another important use of the present invention is in the treatment of certain skin disorders, for example acne. In the treatment of skin disorders, the composition is applied directly to the area being treated, generally by means of applications of varying sizes. Application of the composition with the right pressure gently induces a burn-like condition, which weeps and forms a crust. This crust cracks off, generally in eight days, and a new pink skin is found, which in a short while returns to its natural color. Beneath this skin is regenerated tissue.

The treatment requires approximately eight days. In the treatment of skin disorders of the face including simple aging for example, the composition, in a total amount approximating a fluid ounce, is applied with applicators on the entire face area in seven to ten minutes, resulting in a white localized reaction on the skin. The localized reaction is like a sunburn, and causes a painless edema. The skin weeps. Thymol iodide powder or some other antiseptic powder is applied as soon as the weeping begins, and it is applied whenever the liquid shows through the powder. The patient is kept warm to increase the flow of liquid. The treatment causes the formation of a thick crust, which shrinks as it dries, and presses against the face as edema recedes. On about the eighth day when the scrab cracks, a moistening agent, for example soy oil or another neutral oil is applied, and in an hour or two the face is clear. Contours are lifted, eyelids restored and flesh firmed. Wrinkles, blackheads, large pores, freckles, brown spots, some birthmarks and moles disappear. A man's beard becomes softer and younger. Pits and scare are bettered. The above described process, repeated locally on pits and scars from cuts, X-ray burns, frostbite, and planing, and on some types of skin, keloids, with or without thymol iodide, will eventually remove them.

Another method of applying the compositions for systemic absorption (as in the relief of arthritis) is to slowly drip 2¼ cc. of the compositions on to the palms of the hands while they are rubbed together with the palms flat and the fingers closed. When two or three drops are absorbed another two or three drops are dripped on the palms. This process is continued until the entire 2¼ cc. have been absorbed. This takes about seven minutes. While still rubbing the palms together cool water is run on them. The palms turn white but in about five minutes return to normal color. The compositions have thus entered the system and the local action has been neutralized.

What is claimed is:

1. The method of preparing a composition suitable for topical application in the relief of arthritic pains of joints, which comprises:
   heating 55 to 65 parts phenol to about 190° F.,
   adding 9 to 12 parts methyl salicylate,
   adding 15 to 19 parts glycerine,
   adding 1 to 2 parts water,
   stirring to form a homogeneous solution,
   adding the solution to 8 to 12 parts acetic acid and 0.25 to 0.75 parts camphor,
   agitating to form a clear solution and at the same time, heating to 240° F.,
   cooling after solution has been formed.

References Cited

UNITED STATES PATENTS

| | | | |
|---|---|---|---|
| 138,313 | 4/1873 | Benda | 424—230 |
| 134,808 | 1/1873 | Kintz | 424—230 |
| 284,629 | 9/1883 | Guilliouma | 424—317 |
| 445,592 | 2/1891 | Wilfong | 424—317 |

STANLEY J. FRIEDMAN, Primary Examiner

U.S. Cl. X.R.

424—230, 235